July 23, 1940. C. D. STEWART 2,208,737
BRAKE CONTROL MEANS
Filed June 29, 1939
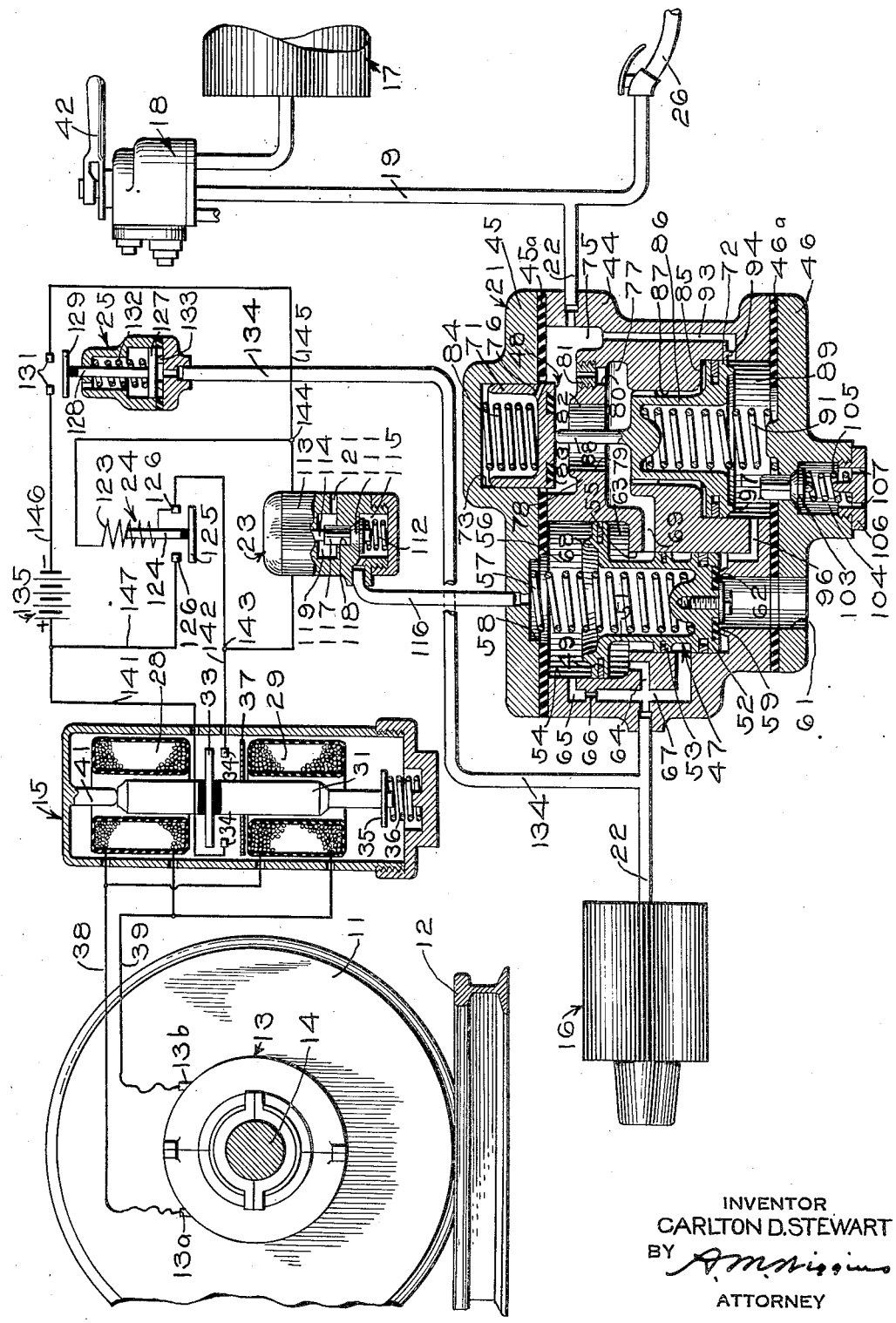
INVENTOR
CARLTON D. STEWART
BY A. M. Higgins
ATTORNEY Patented July 23, 1940

2,208,737

UNITED STATES PATENT OFFICE 2,208,737

BRAKE CONTROL MEANS

Carlton D. Stewart, Wilkinsburg, Pa., assignor to The Westinghouse Air Brake Company, Wilmerding, Pa., a corporation of Pennsylvania Application June 29, 1939, Serial No. 281,840

9 Claims. (Cl. 303—21)

This invention relates to brake control means and particularly to means responsive to the rotative condition of a vehicle wheel for controlling the brakes associated with the wheel in a manner to prevent locking or sliding thereof upon application of the brakes.

As is well known, upon the application of the brakes associated with a vehicle wheel, such as a railway car wheel, to a degree sufficient to overcome the adhesion or rolling friction between the car wheel and the road surface or rail on which it rolls, the wheel will rapidly decelerate to a locked or non-rotative state and slide. It is also known and has been demonstrated that if the brakes are sufficiently and rapidly reduced at the instant the car wheel begins to slip, that is decelerate toward a locked wheel state, the wheel can be made to stop decelerating and to begin accelerating back toward a speed of rotation corresponding to vehicle speed without actually reaching the non-rotative or sliding condition.

In the subsequent description of my invention, it will be understood that the term "sliding" refers only to the dragging of a car wheel along the road surface or rail in a locked or non-rotative state. The rotation of a vehicle wheel at a speed less than a speed corresponding to vehicle speed at the same instant will be referred to as "slip" or a "slipping condition." The distinction between the terms "slide" and "slip" should accordingly be borne in mind.

When a vehicle wheel begins to slip, the time which elapses until it decelerates completely to a locked or non-rotative state, assuming no release of the brakes, is of the order of one second. It is imperative, therefore, that the brakes on a vehicle or car wheel be instantly and rapidly released at the time slipping begins in order to prevent the wheel from decelerating to a locked or non-rotative state. Various arrangements have been proposed, including rotary inertia devices responsive to the rate of deceleration and acceleration of a vehicle wheel for controlling the release of the brakes and the subsequent reapplication thereof. Such mechanical devices present certain difficulties particularly in the manner of mounting in associated relation with a vehicle wheel or car wheel axle as well as the extraordinary accuracy required to make such devices sufficiently sensitive and at the same time sturdy enough to withstand the severe shocks and jars which they must sustain particularly in railway service.

It is accordingly an object of my invention to provide apparatus for controlling vehicle wheel brakes in a manner to prevent the locking or sliding thereof which apparatus obviates some of the problems and difficulties of prior known devices.

More specifically, it is an object of my invention to provide an electrical relay of novel construction and characteristics adapted to be employed in a vehicle brake control apparatus in a manner to be operatively sensitive to a rotative condition of a vehicle wheel, such as a slipping condition.

Briefly, my invention includes a relay that has two coils, each coil being energized from a suitable direct current generator that supplies a voltage corresponding substantially to the speed of rotation of a car wheel, and a contact-carrying armature that is subject to the opposing magnetic forces of the two coils in balanced relation. One of the coils has a lag ring associated therewith in a manner to inhibit changes in the magnetic flux upon changes in the voltage impressed on the coil. When the supply voltage from the generator falls sufficiently rapidly, as when the wheel slips, the slow-acting coil exerts an unbalanced magnetic force on the armature so that it is thus actuated to close an electrical circuit for initiating release of the brakes.

The above objects, and other objects of my invention which will be made apparent in the subsequent detailed description of my invention, are attained by an illustrative embodiment shown in the single figure of the accompanying drawing.

Description

Referring to the single figure of the drawing, there is shown, for illustrative purposes, a single vehicle or car wheel 11 and its associated track rail 12, a suitable direct-current generator or magneto 13 associated with the wheel, as by application to the axle 14 of the wheel, in a manner to supply a voltage substantially proportional to the speed of rotation of the wheel 11, and a relay 15 that is operatively controlled by voltage supplied from the generator 13, and which is one of the features of my invention.

The brake apparatus shown includes a brake cylinder 16 adapted upon the supply of fluid under pressure thereto to effect application of the brakes to the vehicle wheel 11 and upon the release of fluid under pressure therefrom to effect the release of the brakes, a source of fluid pressure such as a reservoir 17, a manually operative brake valve 18 of the self-lapping type, a so-called straight-air pipe 19 adapted to be charged with fluid from the reservoir 17 at a desired pressure under the control of the brake valve 18, and a control valve mechanism 21 interposed in a branch pipe 22 hereinafter called the brake cylinder pipe and connecting the straight-air pipe 19 to brake cylinder 16. As will be made apparent hereinafter, the control valve mechanism 21 is set in operation by a magnet valve device 23 that is operatively controlled by the relay 15, by a self-holding relay 24 and by a pressure switch 25, the switch 25 being controlled according to the pressure in the brake cylinder 16.

It should be understood that while the apparatus is shown as applied to a single wheel or to a pair of wheels having a common axle, it is nevertheless adapted by suitable duplication of parts for the control of the brakes on any desired number of wheels or wheel-axles of a car or train. In this connection, it will be observed that the straight-air pipe 19 is adapted to extend through all cars of a train, the different sections on the various cars being connectable by suitable hose couplings 26, a portion of one of which is shown.

Considering the parts of the equipment in detail, the rotor shaft of the generator may be the wheel axle 14 itself, as shown, or may be suitably connected to rotate with the axle. The stator or non-rotative frame of the generator may be secured to the vehicle wheel truck frame in any suitable manner. The location of the generator 13 as well as the manner in which it is driven is immaterial however, it being essential only that the voltage characteristic of the generator be such that the voltage at the terminals 13a and 13b of the generator be substantially proportional to the rotative speed of the wheel 11 at all times.

The relay 15, which is one of the features of my invention, comprises a suitable casing in which is mounted in coaxial spaced relation a pair of electromagnet coils or solenoids 28 and 29 respectively. Associated with the two coils 28 and 29 is an armature or plunger 31, one end of which is adapted to be surrounded by and magnetically acted upon by the coil 28 and the other end of which is surrounded by and adapted to be magnetically acted upon by the coil 29. If desired, only the end portions of the armature 31 may be of magnetic material while the connecting portion may be of non-magnetic material.

The armature 31 carries in insulated relation thereon a contact-bridging member 33 with which is associated a pair of contact members 34 suitably secured in insulated relation to the casing in a manner not shown.

Interposed between a collar or flange 35 fixed on one end of the plunger 31 and the end of the casing is a coil spring 36 of relatively light tension which serves to urge the plunger 31 in a direction to separate the contact-bridging member 33 from the associated contact members 34, the end of the plunger engaging a suitable stop lug 41 of non-magnetic material attached to or formed on the casing to determine this normal position of the plunger.

Associated with and interposed in the magnetic flux path of the solenoid 29 is a so-called lag ring 37 of copper or other suitable material, which functions in well known manner, upon the interruption of the energizing circuit for the solenoid 29, to delay the dying away of the magnetic flux set up around the solenoid.

The two solenoids 28 and 29 are electrically connected in parallel relation across the terminals 13a and 13b of the generator 13, as by a pair of wires 38 and 39. The arrangement of the solenoids 28 and 29 with respect to the plunger 31 is such that, when energized, the solenoid 28 exerts an upward pull on the plunger 31 and that, when energized, the solenoid 29 exerts a downward pull or force substantially equal to the upward pull of the solenoid 28. Any slight unbalance of forces exerted by the solenoids 28 and 29 on the plunger 31 is compensated for by the force of the spring 36 which acts to prevent any except intended engagement of the contact-bridging member 33 with the contact members 34.

If the voltage at the terminals of the generator 13 changes gradually, as when the vehicle wheel 11 is decelerating rotatively in normal manner during a brake application without slipping, the magnetic pull of the solenoids 28 and 29 remains substantially equal and opposite and accordingly contact-bridging member 33 remains out of engagement with the contact members 34.

If the voltage at the terminals of the generator 13 changes very suddenly and rapidly, as when the vehicle wheel 11 slips, such an unbalance or difference in the magnetic pulls exerted by the two solenoids 28 and 29 occurs as to cause engagement of the contact-bridging member 33 with the contact members 34. It will be seen that since the magnetic flux density around solenoid 29 changes more slowly in response to the decreased voltage than does the magnetic flux density around the solenoid 28, the solenoid 29 will momentarily exert a greater pull than the solenoid 28 and consequently the plunger 31 will be actuated in a direction to effect engagement of the contact-bridging member 33 with the associated contact members 34.

Conversely, if the voltage at the terminals of the generator 13 changes gradually, as when the wheel 11 accelerates in a normal manner, the two solenoids 28 and 29 exert a substantially equal and opposite pull on the armature plunger 31. Also, if the voltage at the terminals of the generator 13 increases suddenly and rapidly as when the wheel 11 accelerates rotatively back toward a speed corresponding to vehicle speed while slipping or in the event that it races due to loss of traction in the case of a traction wheel, the slow response of the solenoid 29 in comparison to the more rapid response of solenoid 28 results in a momentary upward pull on the plunger 31 by the solenoid 38. The upward movement of the plunger 31 is however prevented by the stop 41, so that no movement of the plunger 31 occurs.

It will thus be seen the contact-bridging member 33 of the relay 15 is actuated into contact with the contact members 34 momentarily in response to a given rotative condition of the wheel 11, that is the rapid deceleration of the wheel 11 while slipping. As will be seen hereinafter, the relay 15 is employed to set in operation mechanism for effecting a rapid release of the brakes at the instant the wheel 11 begins to slip.

Brake valve 18 is of the self-lapping type described in detail and claimed in Patent No. 2,042,112 of Ewing K. Lynn and Rankin J. Bush and accordingly a functional description thereof is deemed sufficient for the purposes of the present invention. When the operating handle 42 of the brake valve is in its normal release position, the brake valve is conditioned to vent the straight-air pipe 19 to atmosphere. When the handle 42 is shifted horizontally out of its normal release position into a so-called application zone, the brake valve is effective to establish communication through which fluid under pressure is supplied from the main reservoir 17 to the straight-air pipe 19, the brake valve being automatically self-lapping to establish a pressure in the straight-air pipe 19 substantially proportional to the displacement of the operating handle 42 out of its normal release position.

Should the pressure in the straight-air pipe 19 tend to reduce, due to leakage or for other reasons, from a pressure corresponding to the position of the operating handle, the brake valve is automatically and inherently effective to supply further fluid under pressure to the straight-air pipe to restore and maintain a pressure therein corresponding to the position of the brake valve handle. In this connection, it should be kept in mind that the straight-air pipe 19 extends through all cars of a train so that operation of the brakes on all cars of the train may be effected by the operator under the control of the brake valve 18.

The control valve mechanism 21 is of the type described and claimed in the copending application Serial No. 221,951 of Clyde C. Farmer, filed July 29, 1938, and assigned to the assignee of this application. Valve mechanism 21 comprises a casing having a main section 44 and two end or cover sections 45 and 46 respectively. The two end sections 45 and 46 are secured to the main section 44 in sealed relation, as by gaskets 45a and 46a interposed between the main section 44 and the end sections 45 and 46 respectively, and suitable screws or bolts not shown.

Embodied in the casing of the valve mechanism 21 are a release and reapplication valve device 47 hereinafter referred to as the release valve device, and a so-called reapplication valve device 48.

The release valve device 47 comprises an annular piston 49 having a tubular stem 51 extending to one side thereof, the outer end of the stem being closed and formed as a piston valve 52, hereinafter designated the vent valve. Also formed on the outside of the hollow stem 51 at a point between the vent valve 52 and the piston 49 is another piston valve 53. The piston 49 operates in a suitable bore 54 in the casing section 44, while the vent valve 52 and piston valve 53 operate in a bore 55 of smaller diameter than the bore 54 and in coaxial alignment therewith.

The bore 54 opens at the face of the casing section 44 covered by the end section 45, a chamber 56 being thus formed between the piston 49 and the end casing section 45. Interposed between the casing section 45 and the piston 49 within the chamber 56 is a coil spring 57, one end of which engages in a suitable recess 58 in the casing section 45 and the other end of which is supported within the hollow stem 51 of the piston 49 and bears against the closed end of the hollow stem. The spring 56 thus yieldingly urges the piston 49 in a direction to effect seating of vent valve 52 on an annular rib seat 59 which surrounds an exhaust port 61. An annular gasket 62 is inset in the face of the vent valve 52 for effecting sealing engagement with the annular rib seat 59.

Formed in the casing section 44, between the piston 49 and the piston valve 53 in surrounding relation to the piston stem 51 is an annular chamber 63 to which the brake cylinder 16 is connected through a passage 64 and one section of the brake cylinder pipe 22. Chamber 63 communicates with the chamber 56 above the piston 49, when the piston 49 is in its normal position shown, through a branch passage 65 of the passage 64, the passage 65 containing a restricted portion or choke 66. Another branch passage 67 of the passage 64 opens into the bore 55 at a point immediately above the vent valve 52 when the vent valve is seated on its associated annular rib seat 59.

The choke 66 is of such size that when fluid under pressure is supplied through the annular chamber 63 to the brake cylinder 16, in the manner to be hereinafter described the chamber 56 at the upper side of the piston 49 becomes sufficiently rapidly charged through the choke 66 that the spring 57 is effective to exert sufficient force on the piston 49 to maintain the vent valve 52 seated on its annular rib seat 59. With the annular chamber 63 and the brake cylinder 16 charged with fluid under pressure, a sudden reduction of the pressure in the chamber 56, as by venting in a manner to be hereinafter described, creates a differential fluid pressure force on the piston 49 sufficient to cause it to be shifted upwardly against the yielding resistance of the spring 57 until an annular rib 68, formed on the upper face of the piston 49, engages a seat portion of the gasket 45a open to the bore 54.

When the piston 49 is shifted upwardly to seated relation on the gasket 45a, the vent valve 52 is shifted upwardly to a position in which it establishes communication between the passage 67 and the exhaust port 61, so that fluid under pressure is thus rapidly released from the brake cylinder 16. At the same time, the piston valve 53 laps or closes the opening of a fluid pressure supply passage 69 into annular chamber 63.

In shifting from its normal position to its upper seated position, the piston 49 passes the opening of the passage 65 into the chamber 56 and thus, when piston 49 seats on gasket 45a, the chamber 56 is isolated from the brake cylinder 16. Accordingly, as long as the chamber 56 is maintained vented, and the pressure in the brake cylinder 16 is effective to exert sufficient force in chamber 63 on the lower side of the piston 49 to overcome the spring 57, the piston 49 remains in seated position on gasket 45a. Spring 57 is of such strength that when the pressure in the brake cylinder acting to maintain the piston 49 in seated position on gasket 47 reduces to a certain uniform low pressure, such as five pounds per square inch, the spring becomes effective to shift the piston 49 downwardly to reseat the vent valve 52 on its annular rib seat 59 to close off the exhaust of fluid under pressure from the brake cylinder, and also to uncover the opening of the supply passage 69 into the annular chamber 63.

The reapplication valve device 48 comprises a valve piston 71 and an operating piston 72 therefor.

The valve piston 71 is guided in a suitable bore 73 formed in the casing section 45 and extends out of the bore into a chamber 75 in the casing section 44, to which chamber the straight-air pipe 19 is constantly connected by another section of the brake cylinder pipe 22. A suitable breather port 76 is provided in the valve piston 71 to prevent dash-pot action thereof.

Separating the chamber 75 from another chamber 77 in the casing section 44 out of which leads the supply passage 69 previously referred to, is a wall 78 having therein a relatively large bore or passage 79 and a relatively small passage 80 having a choke element 81 therein. An annular rib seat 82 is formed on the wall 78 in surrounding relation to the bore 79, and the valve piston 71 is adapted to seat on the rib seat 82 to close communication through the bore 79 from the chamber 75 to the chamber 77, thereby restricting communication between the two chambers to the passage 80 containing the choke element 81. An annular gasket 83 is inset in the face of the valve piston 71 for effecting sealing engagement with the annular rib seat 82. Interposed between the casing section 45 and the back side of the valve piston 71 is a coil spring 84 which urges the valve piston 71 downwardly toward seated relation on the annular rib seat 82.

The piston 72 operates in a suitable bore 85 in the casing section 44 and has a hollow externally fluted stem 86 that is slidably guided in a bore 87 of smaller diameter than but in coaxial alignment with the bore 85. The bore 87 opens into the chamber 77 and the outer end of the piston stem 86 is closed and provided with an axially extending pin 88 which extends through the chamber 77 and the bore 79 into the chamber 75 where it engages the seating face of the valve piston 71 at a point within the annular gasket 83.

The bore 85 in which the piston 72 operates opens at the face of the casing section 44 covered by the casing section 46 and a chamber 89 is thus formed between the piston 72 and the casing section 46. Interposed between the casing section 46 and the closed end of the hollow stem 86 of the piston 72 is a coil spring 91 which yieldingly urges the piston 72 away from the end casing section 46 and effects engagement of the end of the pin 88 with the face of the valve piston 71 so as to unseat the valve piston 71 against the yielding resistance of the spring 84.

When the piston 72 is in its upper or raised position unseating the valve piston 71, it uncovers a passage 93 opening into the chamber 89 and connected to the chamber 75. A restriction or choke 94 is provided in the passage 93 for a purpose which will be presently explained.

When the straight-air pipe 19 is charged with fluid under pressure, fluid under pressure flows from the straight-air pipe 19 through the brake cylinder pipe 22 to the chamber 75 of the valve mechanism 21, then past the unseated valve piston 71, through the passage or bore 79, chamber 77, passage 69, annular chamber 63, passage 64 and brake cylinder pipe 22 to the brake cylinder 16. At the same time, fluid under pressure is supplied through passage 93 to the chamber 89 at the lower side of the piston 72. The upper face of the piston 72 including the outer end of the hollow stem 86 thereof is thus subject to the fluid pressure in the chamber 77 and the lower face of the piston is subject to the pressure of fluid supplied to the chamber 89. The choke 94 in the passage 93 is of sufficient size so that the fluid pressures on opposite sides of the piston 72 are built up at substantially the same rate in response to the charging of the straight-air pipe 19. Consequently, the spring 91 remains effective to maintain the piston 72 in its raised position and the valve piston 71 in its open position, as shown.

Operation of the piston 72 in a direction opposed to the force of the spring 91 is effected by a sudden rapid venting of fluid under pressure from the chamber 89. This rapid venting of the chamber 89 is effected by the vent valve 52 of the release valve device 47 when it unseats from its associated annular rib seat 59. As will be seen in the drawing, a passage 96 is provided in the casing section 44 that connects the chamber 89 to the outer seated area of the vent valve 52. The passage 96 opens into the chamber 89 at a point sufficiently close to the end casing section 46 that when the annular rib 97 provided on the seating face of the piston 72 engages a seat portion of the gasket 46a, the passage 96 is lapped or maintained in communication with the outer seated area of the piston 72.

It will be apparent that, due to the choke 94 in the passage 93, the sudden rapid venting of fluid under pressure from the chamber 89 produces a differential fluid pressure force on the piston 72, the fluid pressure in the chamber 77 on the one side of the piston being higher than the pressure of the fluid in the chamber 89 on the opposite side of the piston. Accordingly, upon the rapid venting of the chamber 89, the piston 72 is shifted downwardly into seated engagement on the seat portion of the gasket 46a.

In shifting downwardly into seated relation on the seat portion of the gasket 46a, the piston 72 passes the opening of the passage 93 into the bore 85 so that the pressure of the fluid supplied to the passage 93 becomes effective on the upper face of the piston 72. Thus the space within the hollow stem 86 of the piston and within the annular rib seat 97 on the seating face thereof is isolated at a reduced pressure so that the fluid pressure acting on the upper face of the piston 72 is effective to maintain the piston seated on the gasket 46a until reduced to a relatively low value, such as five pounds per square inch, sufficient to permit the spring 91 to overcome the differential fluid pressure force on the piston and shift it upwardly to its normal position.

In order to insure the maintenance of the piston 72 in seated position, once it is operated thereto, an exhaust valve 103 of the poppet type is provided. Valve 103 is adapted to be unseated from an associated valve seat, formed on the casing section 46, by the piston 72 as it moves into seated relation on the gasket 46a, the seating face of the piston engaging the end of the fluted stem of the exhaust valve 103 that projects into the chamber 89 at a point within the annular rib 97. The exhaust valve 103 is contained in a suitable chamber or bore 104 that is provided in the end casing section 46 and is biased into seated relation on its associated valve seat by a coil spring 105 that is interposed between the valve 103 and a screw plug 106 closing the outer end of the bore 104. The screw plug 106 is provided with suitable ports 107 therein through which fluid under pressure is vented to atmosphere when the valve 103 is unseated.

Accordingly, once the piston 72 seats on the seat portion of the gasket 46a, the interior of the hollow stem 86 of the piston is maintained at atmospheric pressure and thus as long as the pressure on the opposite face of the piston 72 exceeds a low value, such as five pounds per square inch, the piston 72 is positively held in seated relation on the seat portion of the gasket 46a. When the fluid pressure in chamber 77 acting to maintain piston 72 seated on gasket 48 reduced below five pounds per square inch, spring 91 becomes effective to return the piston upwardly to its normal position and unseat the valve piston 71.

The magnet valve device 23 is provided for rapidly venting the chamber 56 of the release valve device 47 of the control valve mechanism 21 in response to the operation of the relay 15. As indicated diagrammatically, the magnet valve device 23 may comprise a valve 111 of the poppet type which is normally urged into seated relation on an associated valve seat by a coil spring 112 and which is unseated against the force of the spring 112 upon energization of an electromagnet winding 113, through the medium of a plunger 114. The valve 111 is contained in a chamber 115 that is constantly connected through a pipe 116 of large capacity to the chamber 56 of the valve mechanism 21. The fluted stem 117 of the valve 111 is guided in a suitable bore 118 and extends into a chamber 119 that is constantly open to atmosphere through an exhaust port 121 of large capacity. The plunger 114 actuated by the electromagnet winding 113 extends into the chamber 119 and engages the end of the fluted stem 117.

It will thus be seen that when the electromagnet winding 113 of the magnet valve device 23 is deenergized, the valve 111 is seated and prevents the exhaust of fluid under pressure from the chamber 56 of the valve mechanism 21. It will also be seen that when the electromagnet winding 113 is energized, the valve 111 is unseated and fluid under pressure is thus rapidly vented from the chamber 56 through the exhaust port 121 of the magnet valve device 23.

The self-holding relay 24 is illustrated diagrammatically and it will be understood that any suitable conventional relay may be provided. As shown, the relay 24 may comprise an electromagnet winding 123 that is effective when energized to actuate an armature 124 so as to effect engagement of a contact member 125 in circuit-closing contact with a pair of associated contact members 126. Suitable biasing means, either gravity or a spring, not shown, is provided for returning the armature 124 and the contact member 125 to circuit-opening position upon deenergization of the winding 123.

The pressure switch 25 is illustrated diagrammatically and it will be understood that it may be of any suitable conventional type. As shown, the pressure switch 25 comprises a suitable casing containing a piston 127 having a stem 128 that carries in insulated relation thereon a contact member 129 with which are associated a pair of stationary contact members 131. A coil spring 132 interposed between one face of the piston and the casing in surrounding relation to the stem 128 is effective normally to urge the piston into seated relation on an annular rib seat 133 formed on the casing, in which position the contact member 129 on the stem is out of engagement with the associated contact members 131. The inner seated area of the piston 127 is constantly connected by a branch pipe 134 to the section of brake cylinder pipe 22 between the brake cylinder 16 and the valve mechanism 21.

Spring 132 is of such strength that when the pressure of the fluid in the brake cylinder exceeds a certain low pressure, such as ten pounds per square inch, the force of the fluid on the piston 127 overcomes the spring 132 and shifts the piston in a direction to effect engagement of the contact member 129 with the associated contact members 131. When the piston 127 unseats from the annular rib seat 133, the sudden increase in area on the face of the piston subject to the fluid pressure results in a sudden and positive movement of the piston and the consequent positive movement of the contact member 129 into engagement with the contact members 131.

Conversely, when the pressure of the fluid in the brake cylinder is reduced below a value sufficient to overcome the spring 132, the spring returns the piston into seated relation on the rib seat 133 and the contact member 129 is accordingly disengaged from the contact members 131.

Current for energizing the electromagnet winding 113 of the magnet valve device 23 and the winding 123 of the relay 24 may be supplied from any suitable source of current such as a storage battery 135. In the case of a railway car, battery 135 may be the usual storage battery provided for lighting the cars.

The circuits on which the magnet valve device 23 and relay 24 operate are so simple as to obviated the need for description thereof. However, the circuits will be traced hereinafter in connection with an assumed operation of the equipment.

*Operation*

Let it be assumed that the reservoir 17 is charged with fluid to the normal pressure, such as one hundred pounds per square inch, in the usual manner, by a fluid compressor, not shown, and that the car or train having the wheel 11 is traveling along the road under power or coasting with the brake valve handle 42 in its normal or brake release position so that the brakes are released.

To effect an application of the brakes, the operator first shuts off propulsion power, if the power is on, and then shifts the brake valve handle 42 out of its normal release position into the application zone an amount corresponding to the desired degree of application of the brakes. The straight-air pipe 19 is accordingly charged to a pressure corresponding to the degree of displacement of the brake valve handle 42 out of its normal position and fluid under pressure is supplied from the straight-air pipe 19 through the brake cylinder pipe 22 and control valve 21 to the brake cylinder 16 to correspondingly charge the brake cylinder.

As long as the wheel 11 on which the brakes are applied by the brake cylinder 16 does not slip, the operator may control the pressure in the brake cylinder 16 by varying the position of the brake valve handle 42 either toward or away from the release position to decrease or increase the degree of brake cylinder pressure and correspondingly the degree of application of the brakes. If the wheel 11 does not slip during the application of the brakes, the pressure corresponding to the position of the brake valve handle 42 is maintained in the brake cylinder throughout the application and is released therefrom by reverse flow through the control valve 21 to the straight-air pipe 19 and atmosphere when the brake valve handle is restored to brake release position.

If the wheel 11 begins to slip, however, due to the application of the brakes, the contact member 33 of relay 15 is actuated into engagement with the contact members 34 and accordingly completes a circuit for energizing the electromagnet windings of the magnet valve device 23 and of the relay 24. This circuit extends from one terminal of the battery 135 marked "+" and hereinafter referred to as the positive terminal, by way of a wire 141, contact members 34 and 33 of the relay 15, a wire 142 to the point 143, where the circuit divides into two parallel branches, one of which includes the electromagnet winding 113 of the magnet valve device 23 and the other of which includes the electromagnet winding 123 of the relay 24, the two branches rejoining at the point 144 and extending thereafter by way of a wire 145, contact members 131 and 129 of the pressure switch 25, now in closed position, to the negative terminal "—" of the battery 135 as by a wire 146.

In view of the fact that the engagement of the contact finger 33 with the associated contact members 34 of relay 15 is only momentary, it is necessary to provide a holding circuit for maintaining the magnet winding of the magnet valve 23 energized after the contact member of the relay 15 disengages the associated contact members 34. This function is performed by the self-holding relay 24 which when energized establishes a holding circuit for thereafter maintaining the magnet winding of the magnet valve 23 and its own magnet winding 123 energized. This circuit extends from the positive terminal of the battery 135 by way of the wire 141, a branch wire 147, contact members 126 and 125 of the relay 24, thence in parallel through the magnet winding 123 of the relay 24 and the magnet winding of the magnet valve device 23 to the point 144, and thence to the negative terminal of the battery 135 in the manner previously traced.

When the electromagnet winding of the magnet valve device 23 is energized as just described, the magnet valve device is effective to rapidly vent fluid under pressure from the chamber 56 associated with the piston 49 of the release valve device 47 of the valve mechanism 21. It is essential that the magnet winding of the magnet valve device 23 be maintained energized long enough to insure adequate venting of the chamber 56. The momentary energization of the magnet winding of the magnet valve device 23 for the duration of the engagement of the contact member 33 with the associated contact members 34 of relay 15, would be insufficient for this purpose. Accordingly, the establishment of the holding circuit by the relay 24 insures the adequate venting of the chamber 56 and the proper operation of the release valve device 47 of the valve mechanism 21. Upon the rapid venting of the chamber 56, the piston 49 is accordingly shifted upwardly to seated relation on the seat portion of the gasket 45a. As previously explained, in this position of the piston 49 the piston valve 53 laps the supply passage 69 so as to cut off the supply of fluid under pressure from the straight-air pipe 19 to brake cylinder 16 and the vent valve 52 is unseated so as to cause fluid under pressure to be rapidly vented from the brake cylinder 16 through the exhaust port 61.

At the same time, the unseating of the vent valve 52 causes fluid under pressure to be rapidly vented from the chamber 89 at one side of the piston 72 of the reapplication valve device 48 and the piston 72 is accordingly operated into seated engagement on the seat portion of the gasket 46a. The valve piston 71 of the reapplication valve device 48 is accordingly shifted downwardly into seated engagement on the annular rib seat 82 and is thereafter maintained in such position as long as the piston 72 is seated on the seat portion of the gasket 46a. As previously explained this continues until the pressure in the straight-air pipe 19 is reduced below a certain low pressure such as five pounds per square inch. Since the pressure in the straight-air pipe 19 is maintained at a relatively high pressure greatly in excess of five pounds per square inch during the application of the brakes, it will be seen that during the remainder of the brake application, the valve piston 71 remains seated on its annular rib seat 82.

Piston 49 of the release valve device 47 is maintained in seated relation on the seat portion of the gasket 45a as long as the pressure in the brake cylinder exceeds a predetermined low pressure such as five pounds per square inch. Accordingly it will be seen that due to the rapid and instantaneous venting of fluid under pressure from the brake cylinder 16 when the wheel 11 begins to slip, and the consequent reduction in the degree of application of the brakes, the wheel does not continue decelerating to a locked or non-rotative state but ceases to decelerate and begins to accelerate back toward a speed corresponding to vehicle speed. The acceleration of the wheel back toward a speed corresponding to car speed is so rapid that it will attain car speed or substantially car speed before the pressure in the brake cylinder reduces below five pounds per square inch. Accordingly the piston 49 of the release valve device 47 is not returned to the position in which the vent valve 52 is reseated on the associated rib seat to close the exhaust port 61 and the piston valve 53 uncovers the opening of the supply passage 69 into the chamber 63 to permit the resupply of fluid under pressure to the brake cylinder until the car wheel has substantially attained a speed corresponding to car speed. The possibility of the wheel 11 actually attaining a locked state and sliding is thus reduced to a minimum because reapplication of the brakes on the wheel 11 cannot be effected while the wheel is in a slipping condition and rotating at a slow speed.

In order to prevent the pumping of the release valve device 47, it is necessary that the magnet winding of the magnet valve device 23 be de-energized slightly before the pressure in the brake cylinder 16 reduces below five pounds per square inch, so that the valve 111 of the magnet valve device 23 may be reseated to cut off the exhaust of fluid under pressure from the chamber 56 before the piston 49 is shifted downwardly to its normal position in response to the reduction of the pressure in the brake cylinder below five pounds per square inch. Pressure switch 25 is accordingly provided and is responsive to the reduction of the pressure in the brake cylinder 16 below ten pounds per square inch to interrupt the holding circuit maintaining the magnet winding of the magnet valve device 23 and of the relay 24 energized.

Thus, upon the shifting of the piston 49 by the spring 57 to the normal position in which it is shown, the piston 49 cannot again be operated to vent fluid under pressure from the brakes to cause unseating of the vent valve 52 until the pressure switch 25 has again been operated to closed position and wheel slip again occurs.

Upon the restoration of the piston valve 53 and vent valve 52 of the release valve device 47 to the normal positions thereof shown, fluid under pressure is again supplied to the brake cylinder 16 from the straight-air pipe 19, this supply taking place automatically due to the pressure maintaining feature of the brake valve 18. The resupply to the brake cylinder 16 is however effected at the restricted rate determined by the choke passage of the choke element 81 because the valve piston 71 remains in seated position closing the large port 79. Due to the fact that the pressure in the brake cylinder 16 is restored gradually through the choke element 81, it is unlikely that a recurrence of wheel slipping will take place because the pressure restored in the brake cylinder will be less for the duration of the application of the brakes than that which initiated the slipping of the wheel.

When the car or train comes to a stop due to an application of the brakes during which slipping of the wheel 11 occurs, the restoration of the brake valve handle 42 to release position to release the brakes prior to again starting the car or train automatically restores the reapplication valve device 48 to its normal position. It will be seen that the reduction of the pressure in the straight-air pipe 19 in response to the restoration of the brake valve handle to release position will ultimately result in the shifting of the piston 72 of the application valve device away from the end casing section 46 and the consequent unseating of the valve piston 71. The valve mechanism 21 is thus automatically restored to the proper condition upon the release of the brakes so that upon a subsequent application of the brakes, fluid under pressure may be supplied to the brake cylinder 16 through the large port 79 at the normal rate.

*Summary*

Summarizing, it will be seen that I have disclosed a vehicle wheel brake control apparatus including a novel mechanism which responds instantly in the event of slipping of a vehicle wheel to initiate the operation of control devices for rapidly releasing the brakes to prevent the slipping wheel from decelerating to a locked or sliding state. A novel feature of my invention is a relay having two electromagnet coils or solenoids both adapted to be energized at a voltage proportional to the rotative speed of the vehicle wheel and having associated therewith an armature in the form of a plunger common to both solenoids adapted upon movement thereof to open and close a switch. One of the solenoids is fast-acting and the other is slow-acting in response to rapid changes in the rotative speed of the vehicle wheel such as occurs when the wheel slips. The two solenoids are arranged to exert substantially equal and opposite forces on the plunger for normal rates of rotative deceleration and acceleration of the vehicle wheel.

When the wheel slips, however, the slow-acting solenoid momentarily exerts a higher force than the fast-acting solenoid and the plunger 31 is consequently shifted to effect operation of a switch device.

The opposing-coil relay operates as a trigger mechanism to complete an initiatory electrical circuit and a relay operating upon this circuit establishes a self-holding circuit for itself and the initiatory circuit to continue the brake release operation notwithstanding the subsequent opening of the contacts of the relay. A pressure switch controlled according to brake cylinder pressure is effective to interrupt the holding circuit when the brake cylinder pressure reduces below a relatively low value so that the control apparatus may function to effect reapplication of the brakes.

While I have illustrated only one embodiment of my invention, it should be apparent that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. In a vehicle wheel brake control apparatus of the type having manually controlled means effective to cause application and release of the brakes associated with the wheels of the vehicle and control means operative during application of the brakes independently of the manually controlled means to effect the rapid release of the brakes associated with at least one wheel, the combination of means for producing an electrical effect substantially proportional in degree to the rotative speed of said one wheel of the vehicle, means operatively responsive only to changes in the degree of the electrical effect produced by the last said means occurring at a rate in excess of a certain rate, and means controlled by said responsive means for initiating operation of the control means.

2. In a vehicle wheel brake control apparatus of the type having manually controlled means effective to cause application and release of the brakes associated with the wheels of the vehicle and control means operative during application of the brakes independently of the manually controlled means to effect rapid release of the brakes associated with at least one wheel, the combination of means for producing an electrical effect substantially proportional in degree to the rotative speed of the said one wheel of the vehicle, means operatively responsive only to changes in the degree of the electrical effect produced by the last said means occurring at a rate in excess of a certain rate when the said vehicle wheel slips, and means controlled by said responsive means for initiating operation of the control means.

3. Apparatus for registering the slipping condition of a vehicle wheel comprising means so constructed and arranged as to produce an electrical effect which is substantially proportional in degree to the rotative speed of the vehicle wheel, and means operatively responsive only to changes in the degree of the electrical effect produced by the last said means occurring at a rate in excess of a certain rate.

4. Apparatus for registering the slipping condition of a vehicle wheel comprising means so constructed and arranged as to produce a voltage substantially proportional to the rotative speed of the vehicle wheel, and electroresponsive means subject to the voltage of the last said means and operatively responsive only to changes in the said voltage occurring at a rate in excess of a certain rate.

5. Apparatus for registering the slipping condition of a vehicle wheel comprising a single source of voltage so constructed and arranged as to product a voltage substantially proportional to the rotative speed of the vehicle wheel, a pair of electromagnetic windings on each of which the voltage produced by the said single voltage source is impressed, a magnetic element associated with said windings, said windings being so constructed and arranged as to exert substantially equal and opposite forces on said magnetic element as long as the voltage impressed on said windings does not change at a rate in excess of a certain rate and effective to exert an unbalanced force on the magnetic element causing displacement out of a normal position thereof when the voltage impressed on the windings changes at a rate in excess of said certain rate.

6. Apparatus for registering the slipping condition of a vehicle wheel comprising a single source of voltage so constructed and arranged as to produce a voltage substantially proportional to the rotative speed of the vehicle wheel, a pair of electromagnetic windings on each of which the voltage produced by the said single voltage source is impressed, a magnetic element associated with said windings, said windings being so constructed and arranged as to exert substantially equal and opposite forces on said magnetic element as long as the voltage impressed on said windings does not change at a rate in excess of a certain rate and effective to exert an unbalanced force on the magnetic element causing displacement out of a normal position thereof when the voltage impressed on the winding changes at a rate in excess of said certain rate, and switch means operative in response to the movement of said magnetic element.

7. Apparatus for registering a slipping condition of a vehicle wheel comprising means so constructed and arranged as to produce a voltage substantially proportional to the rotative speed of the vehicle wheel, two electromagnet windings subject to the voltage of the last said means, a magnetic element associated with said windings, said windings being so constructed and arranged that the magnetic effect of the windings on the magnetic element is such as to exert oppositely directed forces on the magnetic element, and means associated with one of said windings effective to inhibit changes in the magnetic effect of said one winding on the magnetic element in response to changes in the voltage impressed thereon to cause said one winding to exert momentarily on said magnetic element a force greater than that exerted by the other of said windings only when the vehicle wheel begins to slip, the force exerted by said windings on said magnetic element being substantially equal as long as changes in the voltage impressed thereon occur in response to variations in the speed of rotation in the vehicle wheel while not slipping.

8. A relay device comprising two electromagnet windings adapted to have a common voltage impressed thereon and arranged in spaced relation so as to set up separate magnetic fields, a magnetic element associated with said windings in a manner so as to be subject to the influence of the magnetic fields of both said windings, said windings being so arranged that the magnetic effect of the two windings on the magnetic element is such as to exert substantially equal and oppositely directed forces thereon, and means associated with one of said windings effective to inhibit changes in the magnetic effect of said one winding on the magnetic element in response to changes in the voltage impressed on said windings occurring at a rate in excess of a certain rate whereby said one winding momentarily exerts a greater force on the magnetic element than the other winding and causes the said magnetic element to be displaced out of a normal position thereof.

9. In a vehicle fluid pressure brake apparatus of the type having a brake cylinder effective upon the supply of fluid under pressure thereto to effect application of the brakes associated with a vehicle wheel and upon the release of fluid under pressure of the brake cylinder to effect a release of the brakes, a communication through which fluid under pressure is supplied to and released from the brake cylinder, and valve means in said communication operative to interrupt the supply of fluid under pressure through the communication to the brake cylinder and to vent fluid under pressure from the brake cylinder and to continue venting of fluid under pressure from the brake cylinder until the pressure in the brake cylinder reduces below a certain uniform low pressure and then automatically effective to cut off the venting of the brake cylinder and restore said communication to permit fluid under pressure to be resupplied to the brake cylinder, the combination of electroresponsive means effective when energized to initiate operation of the valve means, a circuit on which said electroresponsive means operates, means so constructed and arranged as to produce an electrical effect substantially proportional in degree to the rotative speed of the vehicle wheel on which the brakes are applied and released by the said brake cylinder, a relay device operatively responsive only to the rate of change in the degree of the electrical effect produced by the last said means when the wheel begins to slip to effect completion of said circuit and energization of said electroresponsive means, electroresponsive switch means operating on said circuit and effective in response to the completion of the circuit for maintaining the electroresponsive means energized independently of the said relay device, and a pressure switch controlled by the pressure of the brake cylinder and effective to interrupt the circuit for energizing the electroresponsive means when the pressure in the brake cylinder is reduced in response to the operation of the said valve means prior to the time that said valve means is operated to restore the communication through which fluid under pressure is resupplied to the brake cylinder.

CARLTON D. STEWART.